May 20, 1958  J. W. OEHRLI  2,835,238
SUPERCHARGER SYSTEM FOR INTERNAL COMBUSTION ENGINES
Original Filed Oct. 26, 1953  2 Sheets-Sheet 1

JOHN W. OEHRLI
INVENTOR.

BY
Attorney

May 20, 1958  J. W. OEHRLI  2,835,238
SUPERCHARGER SYSTEM FOR INTERNAL COMBUSTION ENGINES
Original Filed Oct. 26, 1953  2 Sheets-Sheet 2
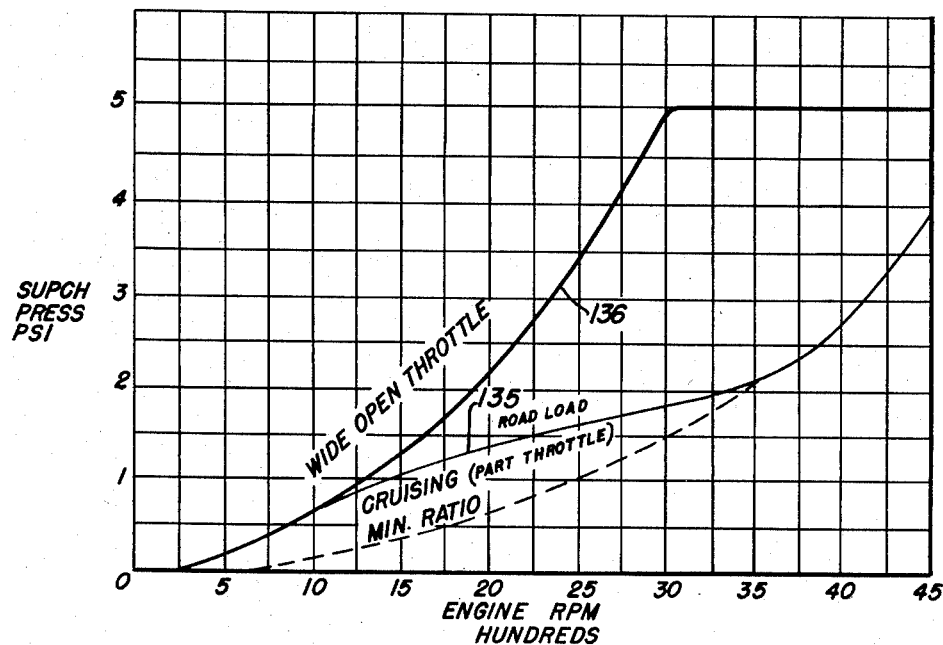
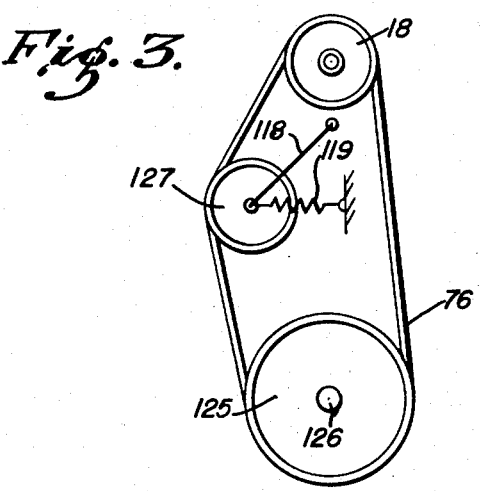
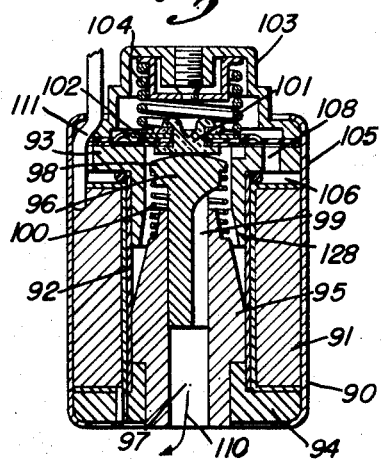
INVENTOR.
JOHN W. OEHRLI United States Patent Office 2,835,238
Patented May 20, 1958

2,835,238

SUPERCHARGER SYSTEM FOR INTERNAL COMBUSTION ENGINES

John W. Oehrli, Los Angeles, Calif., assignor to McCulloch Motors Corporation, Los Angeles, Calif., a corporation of Wisconsin Original application October 26, 1953, Serial No. 388,248. Divided and this application January 17, 1955, Serial No. 482,019

14 Claims. (Cl. 123—119)

This invention relates in general to means for supplying air under pressure to internal combustion engines and relates in particular to a supercharger system having a simple and effective control means. This application is a division of copending application, Serial No. 388,248, filed by the same inventor October 26, 1953, for High Speed Friction Drive.

It is an object of the invention to provide a supercharger system for internal combustion engines having a control which is operative under different power requirement conditions of operation of the engine, referred to herein as a first condition of operation including cruising or slow acceleration and a second condition of operation including high power or fast acceleration of the engine.

It is a further object of the invention to provide a system which will supply air under pressure to an internal combustion engine wherein under the first condition of operation the pressure of the air delivered to the engine will be limited within a predetermined low range, and wherein the pressure limitation referred to in the foregoing is removed under the second condition of operation so that the system will deliver to the engine air under greater pressure and ample volume to obtain high power and fast acceleration of the engine.

It is a further object of the invention to provide a supercharger system having a supercharger which is driven from the internal combustion engine through a variable speed drive and which has a control for the variable speed drive which limits the maximum air pressure delivered by the supercharger during a specified crusing operation of the engine, this control also having means which removes the pressure limitation and thereafter controls the operation of the variable speed drive in such a manner as to prevent driving of the supercharger at a speed greater than a second maximum speed during the high power or rapid acceleration condition of operation of the engine.

A further object of the invention is to provide a supercharger control which is actuated by pressure of air delivered by the supercharger, having speed change mechanism responsive to air pressure and to valve means for control of the air which flows under presure from the supercharger outlet to the pressure responsive means.

A further object of the invention is to provide a simple and effective variable ratio drive for carrying power from the internal combustion engine to the supercharger including a V-belt and variable diameter pulleys, the action of which is controlled in part by air pressure and by spring pressure.

A further object of the invention is to provide a variable ratio drive as described in the preceding paragraph wherein control is effected in part by pressure yieldably applied to an idler sheave which engages the V-belt of the drive.

A further object of the invention is to provide a supercharger control having a valve mechanism wherein the functions of two separate valves are embraced in a single valve structure having elements which are controlled in part by power requirements of the internal combustion engine.

Further objects and advantages of the invention may be brought out in the following part of the specification wherein I have described in detail and for the purpose of making a complete disclosure, a preferred embodiment of my invention, without any intent to thereby limit the scope of the invention which is set forth in the appended claims.

Referring to the accompanying drawings which are for illustrative purposes only:

Fig. 2 is an enlarged sectional view of the valve mechanism;

Fig. 3 is a schematic view showing the belt tensioning means forming a part of the control for the variable ratio transmission of the system; and Fig. 4 is a graph illustrating the characteristics of the air pressure control attained in the operation of the system.

Figure 1:
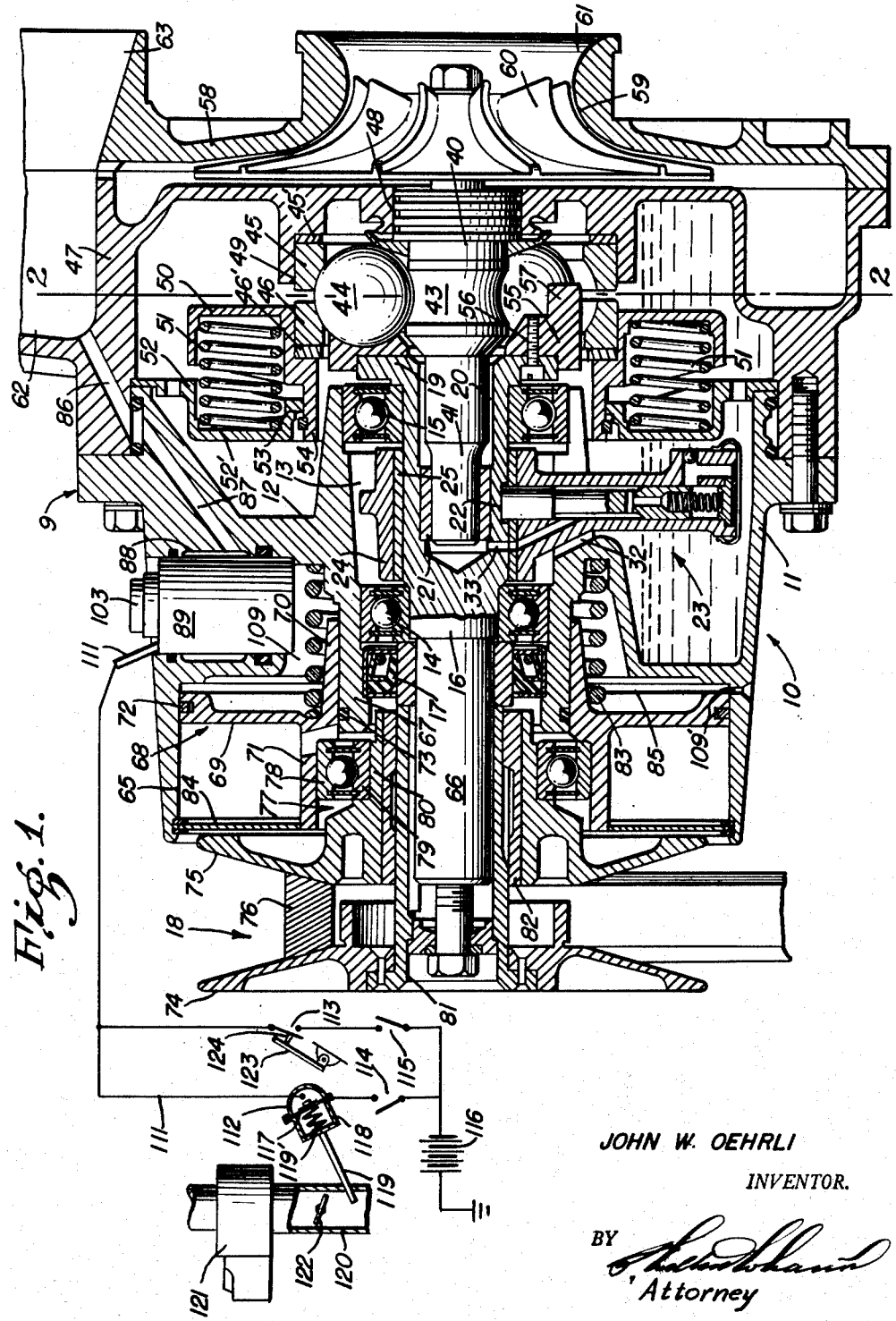
Fig. 1 is a schematic view, partly in section, of a preferred embodiment of the invention.

The system is shown in its entirety in Fig. 1. It includes a supercharger and drive mechanism 9 contained in a shell 10. It includes a body portion 11 having therein a cylindrical wall defining a shaft receiving opening 13 in which ball bearings 14 and 15 support a driving shaft 16, there being a greased seal 17 around the shaft 16 adjacent the end of the opening 13. Driving means, including a variable diameter pulley 18 is supported upon the leftward ends of the shaft 16.

The shaft 16 has on its inner end a flange 19 and has an axial opening 20 extending inwardly from the inner end thereof. Adjacent the bottom of the opening 20 there is a pilot sleeve bearing 21, and in the outer face of the driving shaft 16, positioned between the bearings 14 and 15 there is an eccentric cam face 22 for operation of a pump 23 which is insertable in the body 10 as a separate unit. An oil discharge passage 32 of the pump communicates through a passage 33 in the shaft 16 with the inner end of the shaft opening 20.

A driven shaft 40 is disposed adjacent the inner end of the driving shaft 16 and is provided with a stem 41 which projects into the opening 20 of the shaft 16 and rotates within the bearing sleeve 21. The driven shaft 40 has a ball race 43 on the exterior thereof in which balls 44 are arranged. These balls 44 are held in the ball race 43 by outer race rings 45 and 46 disposed so as to engage outer portions of the balls 44. The hollow body 11 of the support or shell 10 has a cover 47 with an axial opening 48 through which a portion of the driven shaft 40 extends, and a recess 49 arranged to support at least one of the race rings. In the form of the invention shown, the race ring 45 is a close fit within the recess 49 so that it is held in a position concentric to the axis of the shafts 16 and 40 and there is a clutch ring 45' disposed in the bottom of the recess and against which the ring 49 rests, the clutch ring permitting slippage of the race ring 45 under excess load.

The race ring 45 engages an outer portion of each ball 44 lying to one side of the median plane of the balls 44 indicated by the line 2—2. The race ring 46, which is symmetrical to the ring 45 engages the outer portion of each ball 44 on the opposite side of the medial plane of the balls 44. The race ring 46 is held and forcibly pressed toward the ring 45 by a clutch ring 46' which is supported by an annular supporting member 50 which is urged rightwardly by coil springs 51, the ring 46' permitting slippage of the race ring 46 under excess load. The springs 51 are arranged in a circle around the shaft 16 and the leftward ends thereof are seated in pockets 52' in a stationary annular supporting member 52, having an opening 53 to receive and guide the leftwardly extending portion 54 of the annular member 50.

A ball driving member 55 is provided for transmitting from the shaft 16, when it is driven, a rolling movement of the balls 44 within the race rings 45 and 46. The drive means 55 comprises a ring 56 which is secured to the rightward face of the flange 19 and which has fingers 57 which project into spaces between adjacent balls 44. When the shaft 16 is rotated, the fingers 57 travel in a circle around the ball race 43 and cause the balls 44 to move in this circle, the result being that the balls 44 roll in the annular track provided by the race rings 45 and 46. That is to say, the balls 44 rotate about their own axes as the result of their engagement with the race rings 45 and then act as planets to rotate the driven shaft 40 at a speed considerably greater than the speed of rotation of the shaft 16. During the operation of the drive, oil from the pump 23 passes through the bearing clearance of sleeve 21 and then out through the opening 20 in the shaft 16 and through the driver 55 to the balls 44. A supercharger housing 58 is secured to the rightward face of the cover 47 and has therein a pumping space 59 in which an impeller 60 is rotated. Such impeller 60 is secured on the rightward end of the driven shaft 40 and is arranged to move air from an inlet port 61 in the housing 58 to volute discharge passage 62 having an outlet opening 63.

The race rings 45 and 46, as shown in Fig. 1, are of wedge shape cross section, and the result of the race ring 46 being forced toward the race ring 45 is to press the balls 44 tightly into the ball race 43 and effect a positive contact of the balls 44 with the race members 43, 45 and 46.

At the leftward end of the body or shell 10, Fig. 1, there is air pressure responsive means entering into the control of the pulley 18. It includes a cylinder 65 surrounding the leftward portion 66 of the shaft 16 and also surrounding a portion 67 of the wall 12 which supports the bearings 14 and 15. Within the cylinder 65 there is an annular piston 68 comprising a radial wall 69 and rightwardly and leftwardly extending cylindrical walls 70 and 71. The cylindrical wall 70 is slidable upon the leftward portion 67 of the wall 12 and the periphery of the radial wall 69 is slidable along the inner face of the cylinder 65, there being sealing rings 72 and 73 operative between the annular piston 68 and the cylindrical walls 65 and 67. The pulley 18 comprises a fixed flange 74 and an axially movable flange 75. It is the purpose of the piston 68 to move the flange 75 toward the flange 74 and thereby increase the effective diameter of the pulley 18 and shift the belt 76 outwardly from the piston in which it is shown in Fig. 1. This shifting of the flange 75 is accomplished by use of a ball bearing 77, the outer race 78 of which is carried within the cylindrical wall 71 of the piston 68 and the inner race 79 of which is mounted upon a sleeve 80 which projects rightwardly from the hub of the flange 75.

The flange 74 of the pulley 18 is fixedly secured to the leftward portion 66 of the shaft 16 by a sleeve 81 which extends through the hub of the flange 75 and within the sleeve 80 of the flange 75 and in surrounding relation to the shaft portion 66 upon which it is keyed. The sleeve 80 of the flange 75 contains therein a sleeve insert 82 which is splined on the sleeve 81, thereby permitting axial movement of the flange 75 along the sleeve 81 and the shaft portion 66 on which it is mounted. The inner race 79 of the ball bearing 77 rotates within the outer race 78. When air pressure against the rightward face of the annular piston 68 moves the same leftwardly, leftward movement will be transmitted through the ball bearing 78 to the flange 75, to move the same toward the flange 74. Leftward movement of the annular piston 68 is assisted by a compression spring 83. An annular wall 84 is supported within the outer end of the cylinder 65 and surrounds the leftward portion of the cylindrical wall 71 of the piston 68, to guard the interior of the cylinder 65 against entry of foreign matter.

Air is fed into the chamber 85 which exists adjacent the rightward face of the annular piston 68 from the outlet passage 62 of the supercharger housing, through a passage 86 formed in the cover 47 of the shell 10 and a passage 87 in the shell 10 arranged so that its leftward end will communicate with an intermediate portion of a cavity 88 formed in the shell to receive a pressure regulator 89, which is in effect a dual valve means, the details of which are shown in Fig. 4.

The regulator 89 includes a cylindrical shell 90 which contains a solenoid winding 91 arranged around a tube 92. Upper and lower core members 93 and 94, of annular form, are fitted into the ends of the solenoid 91 and a first valve means comprising tubular iron armature 95 is slidably arranged within the tube 92 between the core inserts 93 and 94.

A second valve member 96 is arranged in the upper portion of the opening 97 of the armature 95, this valve member 96 having a head 98 disposed above the armature 95 and having an air passage 99 which extends from a point adjacent the lower end of the head 98 to the lower end of the valve member 96. A coil spring 100 disposed between the upper end of the armature 95 and the valve head 98 urges the valve member upwardly against the central member 101 of a diaphragm 102 which is held in a position extending across the upper face of the core member 93 by a cap 103 which is secured in the upper end of the shell 90. A compression spring 104 urges the diaphragm 102 downwardly into the position in which it is shown in Fig. 2, and the position of the diaphragm 102 determines the position of the valve member 96. When the diaphragm 102 is raised from the position in which it is shown by air pressure applied to its lower face it will permit a small upward movement of the valve member 96 by the spring 100. The shell 90 has therein an air opening 105 which connects the space 106 within the shell 90 between the solenoid 91 and the core member 93 with the air passage 87 through a segregated portion 107 of the cavity 88. The core member 93 has an opening 108 therethrough for passage of air under pressure to the space adjacent the lower face of the diaphragm 102. Accordingly, when the armature 95 is in the position in which it is shown in Fig. 2, the first valve means is open and air may pass from the outlet passage 62 of the supercharger through passages 86 and 87, space 107, opening 105, space 106, opening 108, across the lower face of the diaphragm 102, through passage 99 of the valve member 96, through axial opening 97 of the armature 95 into the space 109 adjacent the rightward face of the annular piston 68, as indicated by the arrow 110. The pressure of this air will act to shift the piston 68 leftwardly.

One end of the solenoid winding 91 is grounded and the other end thereof is connected through a conductor 111 with control switches 112 and 113 which are arranged in series with manually operable switches 114 and 115 which are in turn connected to a source of electrical energy indicated as a battery 116, as shown in Fig. 1. One contact of the switch 112 is carried by a movable wall, such as a diaphragm 117 which forms one wall of a chamber 118 connected through a duct 119 with an intake duct 120 which connects a carburetor 121 with the cylinders of an internal combustion engine, not shown. The duct 119 is connected to the intake 120 at a point downstream from the butterfly valve 122 of the carburetor 121. When the engine is operating under low power or cruising condition, the butterfly valve 122 is nearly closed and a relative high vacuum will exist in the duct 120 downstream from the valve 122. This reduced pressure, or suction, acting within the chamber 18 will pull the diaphragm 117, against the compression of a control spring 119', in leftward direction so as to hold the switch 112 open. However, when the butterfly valve 112 is opened to give high power or rapid acceleration operation of the engine, the vacuum existing in the duct 120 below the valve 122 will be reduced so that the spring 119 may act against the diaphragm 117 so as to close the switch 112. As further schematically shown in Fig. 1, the accelerator pedal 123 is arranged through a linkage 124 to close the switch 113 when the accelerator pedal 123 is depressed to a predetermined extent. If the operator of the internal combustion engine desires automatic operation of the supercharger control by the switch 112 or through the switch 113 he will close the selected manually operated switches 114 or 115 respectively associated therewith.

As schematically shown in Fig. 3, the belt 76 runs over a sheave 125 which is fixed on a shaft 126 of the internal combustion engine with which the supercharger system is employed, the speed of this shaft 126 varying with the speed of rotation of the engine crankshaft. The belt 76 also runs over an idler belt take up sheave 127, shown as being mounted on a lever arm 118 and being adapted to be moved by a spring 119 in a direction to hold the loop of the belt 76 tight on the driving sheave 125 and the variable diameter driven sheave 18.

The spring 118 creates a tension in the belt 76 acting to pull the belt down into the space between the flanges 74 and 75 of the pulley 18 as shown in Fig. 1, to reduce the effect of diameter of the pulley 18 and thereby increase the drive ratio of the transmission formed by the pulleys 18 and 125 of the belt 76. The tension in the belt 76 therefore acts to move the flange 75 rightwardly against the leftward pressure of the spring 83 and also the pressure of air in the chamber 85 existing adjacent the rightward face of the piston 68. Tension in the belt 76 is sufficient to overcome the effect of the spring 83; therefore, if relatively low pressure exists in the space 62 of the supercharger so that the pressure in the space 85 is relatively low, the belt 76 will be pulled down into a position thereto or at the bottom of the flanges 74 and 75, as shown in Fig. 1, to increase the ratio of the belt transmission and thereby drive the impeller 60 at relatively high velocity so as to quickly build up the pressure in the space 68, which will be transmitted to the space 85 and will supplement the leftward force of the spring 83 to move the piston 68 and the flange 75 leftwardly until a balanced condition is effected. That is to say, the flange 75 will be moved leftwardly to increase the effective diameter of the pulley 18, thereby slowing down the speed of the impeller 16 and reducing the pressure in the space 85 to such a point that the forces acting leftwardly upon the piston 68 are equal to the force of the belt 76 tending to move the flange 75 rightwardly.

The following is an explanation of characteristic operation of the control. When the engine is operating at cruising speed and under low power conditions, the switch 112 will be open and the solenoid 91 will be de-energized so that the first valve means consisting of the armature 95 will be in the lowered position in which it is shown in Fig. 2, the valve passage 99 being open so that air pressure from the outlet chamber 62 of the supercharger may pass freely to the chamber or face 109 adjacent the rightward face of the piston 68.

As explained in the preceding paragraph the forces acting upon the movable flange 75 will become balanced when the effective diameter of the pulley 18 is such as to effect a predetermined pressure in the outlet 62 of the supercharger having a relatively low value, for example, between one and two pounds per square inch as indicated by the curve 135 of Fig. 4 up to engine crusing speeds of about 3,500 R. P. M. at which time the drive ratio of the belt transmission will be at a minimum. Accordingly, further increase in engine speed will effect an increase in air pressure as shown by the rightward end of the curve 135. If additional power for hill climbing or rapid acceleration requires opening of the butterfly valve 122, the reduction in vacuum in the duct 120 to a point where the pressure rises to a value near atmospheric will result in the closing of the switch 112, energizing the solenoid 91 so that the armature 95 will be magnetically pulled upwardly into engagement with the lower face of the head 98 of the valve member 96, thereby closing the first valve means so as to close the passage 99 and prevent air pressure from the outlet chamber 62 of the supercharger from passing to the chamber 109 which is in open communication with the space 85 adjacent the rightward face of the piston 68. Air pressure in space 85 is bled off through orifice 109'. This reduction in pressure in the space 85 will permit the piston 68 to be moved rightwardly by belt tension produced by idler spring 119 and the belt 76 will move toward high driving ratio position, as shown in Fig. 1, effecting an increase on the speed of the impeller 60 until the air pressure built up in the chamber 62 of the supercharger reaches a value sufficiently high, for example about 5 lbs. per sq. in., to lift the diaphragm 102 of the pressure regulator 89 against the downward force of the control spring 104. This raising of the diaphragm 102 will result in an upward movement of the part 101 thereof so that the spring 100 may lift the second valve member 96 upwardly away from the upper end of the armature 95 which is now stopped against the downwardly projecting portion 128 of the upper core member 93. This relative upward movement of the valve member 96 will permit air under pressure to pass through the passage 99 to the space 109, to then act against the rightward face of the piston 68 to shift the same leftwardly and reduce the driving ratio of the belt transmission as the result of moving the flange 75 toward the flange 74, preventing increase in speed of the supercharger impeller 60 measurably above that which will produce an air pressure of about 5 lbs. per sq. in. in the outlet chamber 62 of the supercharger and therefore in the inlet duct leading to the fuel intake means of the internal combustion engine, shown in this example of the invention as being the carburetor 121.

As further shown in Fig. 4, which has reference to a gasoline driven engine of an automobile equipped with the supercharger system, the air pressure delivered to the engine intake during high power or rapid acceleration conditions using substantially wide open throttle will be found to be substantially as indicated by the curve 136. The air delivery pressures given in Fig. 4 may be varied by changing the relative values of the control components consisting of the area of the piston 63 and the strengths of the springs 83, 104 and 119. A simple means of varying the pressures in the air delivered by the supercharger consists in varying the tension in the belt 76 which is effected by changing the value of the spring 119.

I claim:

1. In a supercharger system for internal combustion engines: a supercharger for delivering air to the engine; a variable ratio transmission connecting the engine shaft to the operative part of the supercharger; control means for said transmission operating in response to an increase in the pressure of received air to decrease the speed ratio of said transmission; duct means connecting said control means to the air outlet of said supercharger; valve means connected to said duct for controlling the flow of air therethrough to said control means; and means for operating said valve in accordance with changes in a condition of operation of said engine.

2. In a supercharger system for internal combustion engines: a supercharger for delivering air to the engine; a variable ratio transmission connecting the engine shaft to the operative part of the supercharger; control means for said transmission operating in response to an increase in the pressure of received air to decrease the speed ratio of said transmission; duct means connecting said control means to the air outlet of said supercharger; valve means connected to said duct for controlling the flow of air therethrough to said control means; engine control means for controlling the delivery of fuel to the engine; and a connection from said engine control means to said valve means operating to close the same when the engine control means is actuated for high power operation of the engine.

3. In a supercharger system for an internal combustion engine having a carburetor: a supercharger having its air outlet connected to the intake of the engine; means for effecting a driving of said supercharger so that it will deliver air to the engine in a low pressure range; second means for effecting a driving of the supercharger so that it will deliver air to the engine in a high pressure range; and control means operating in response to an increase in pressure in the outlet of said carburetor for bringing said second means into operation in conjunction with the feeding of more fuel to the engine when high power operation of the engine is desired.

4. In a supercharger system for internal combustion engines: supercharger means having an air outlet for connection to the engine intake; a variable ratio transmission for driving said supercharger means, said transmission having a low pressure operating range wherein air at a pressure varying within relatively low pressure range is fed to the engine intake as the speed of the engine is increased from low to high, and a high pressure operating range wherein air at a pressure varying within a relatively high pressure range is fed to the engine intake as the speed of the engine is increased from low to high; and control means operating to simultaneously increase the quantity of fuel being fed to the engine and adjust said supercharger means to its high pressure operating range.

5. In a system for driving the supercharger of an internal combustion engine: a variable ratio transmission for driving the supercharger, having its input connected to the engine and its output connected to the supercharger; control means acting during the operation of the engine under low power delivery condition to control said transmission so that its output-input ratio decreases as the speed of the engine increases from a low speed range to a high speed range; and means for overriding said control means so that the output-input ratio of said transmission will be retained in a relatively high range as the speed of the engine increases from a low range to a high range.

6. A system as defined in claim 5 wherein said means for overriding said control means is operated by a connection with the power control means of the engine.

7. A system as defined in claim 5 wherein said means for overriding said control means is adapted to be operated by changes in pressure in the fuel intake of the engine.

8. A system as defined in claim 5 wherein said variable ratio transmission comprises a pair of V-belt sheaves, one being arranged to be driven by the engine and the other arranged to drive the supercharger, and a V-belt running over said sheaves, one of said sheaves being variable in diameter, and wherein said control means comprises a fluid motor acting in response to air under pressure from the outlet of said supercharger to vary the diameter of the variable diameter sheave.

9. A system as defined in claim 8 having means operating independently of said fluid motor to vary the tension in said V-belt.

10. A system as defined in claim 8 having spring means tending to increase the diameter of said variable diameter sheave and also spring means acting independently of said fluid motor to create tension in said V-belt.

11. A system as defined in claim 5 also having means operating to restore said control means to operation when a predetermined high speed of said supercharger is attained, thereby limiting the maximum speed of said supercharger.

12. In a system for driving the supercharger of an internal combustion engine: a variable ratio transmission for driving the supercharger, having its input connected to the engine and its output connected to the supercharger; control means having a connection with the air outlet of said supercharger and acting in response to the increase in air pressure delivered by said supercharger during the operation of the engine under low power delivery condition to control said transmission so that its output-input ratio decreases as the speed of the engine increases from a low speed range to a high speed range; and means, including a valve in said connection, for overriding said control means so that the output-input ratio of said transmission will be retained in a relatively high range as the speed of the engine increases from a low range to a high range.

13. A system as defined in claim 12 wherein said overriding means is adapted to close said valve and thereby shut down the flow of air under pressure from said supercharger to said control means, and also having means for feeding air under pressure from said supercharger to said control means when a predetermined high pressure is attained in the outlet of said supercharger, whereby the control means will again act to decrease the output-input ratio of said transmission and limit the maximum pressure of air delivered by said supercharger.

14. A device as defined in claim 13 wherein said valve of said overriding means has a closure and electromagnetic means for closing and opening said closure and wherein said means for feeding air under pressure from said supercharger to said control means when a predetermined high pressure is attained comprises a valve and a diaphragm acting under high air pressure from said supercharger to effect opening of said last named valve.

References Cited in the file of this patent

UNITED STATES PATENTS

| | | |
|---|---|---|
| 2,187,737 | Gregory | Jan. 23, 1940 |
| 2,217,364 | Halford et al. | Oct. 8, 1940 |
| 2,556,191 | Jorgensen et al. | June 12, 1951 |